US009655007B2

(12) United States Patent
Reznik et al.

(10) Patent No.: US 9,655,007 B2
(45) Date of Patent: May 16, 2017

(54) MANAGING DATA MOBILITY POLICIES

(75) Inventors: Alexander Reznik, Titusville, NJ (US);
Chonggang Wang, Princeton, NJ (US);
Catherine Livet, Montreal (CA);
Kenneth F. Lynch, Wayne, PA (US);
Robert G. Gazda, Spring City, PA (US); Kevin Di Lallo, Montreal (CA);
Martin Jolicoeur, Dollard-des-Ormeaux (CA); Jeremy Pallats, Laval (CA); Michel Roy, Candiac (CA); Reeteshkumar Varshney, Gurgaon (IN)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/535,713

(22) Filed: Jun. 28, 2012

(65) Prior Publication Data

US 2013/0170351 A1   Jul. 4, 2013

Related U.S. Application Data

(60) Provisional application No. 61/502,105, filed on Jun. 28, 2011.

(51) Int. Cl.
*H04W 28/10* (2009.01)
*H04L 12/707* (2013.01)
*H04L 12/24* (2006.01)

(52) U.S. Cl.
CPC ......... *H04W 28/10* (2013.01); *H04L 41/0893* (2013.01); *H04L 41/12* (2013.01); *H04L 45/22* (2013.01)

(58) Field of Classification Search
CPC ....... H04L 47/80; H04L 41/12; H04L 43/026; H04L 47/14; H04L 47/20; H04L 47/801;
(Continued)

(56) References Cited

U.S. PATENT DOCUMENTS

| 7,161,947 B1 * | 1/2007 | Desai ............................. 370/401 |
| 2009/0070470 A1 | 3/2009 | Bauman et al. |

(Continued)

FOREIGN PATENT DOCUMENTS

| EP | 1720315 B1 | 7/2008 |
| TW | I498770 B | 9/2015 |
| WO | WO 2010/112077 A1 | 10/2010 |

OTHER PUBLICATIONS

3rd Generation Partnership Project (3GPP), S2-111732, "Scenarios for data identification in ANDSF", Motorola Mobility, 3GPP TSG SA WG2 Meeting #84, Bratislava, Slovakia, Apr. 11-15, 2011, 2 pages.

(Continued)

*Primary Examiner* — Omer S Mian
(74) *Attorney, Agent, or Firm* — Condo Roccia Koptiw LLP

(57) ABSTRACT

Systems, methods, and instrumentalities are disclosed to communicate traffic flow information to a network. A user equipment (UE) may detect a traffic flow (e.g., using one or more of the traffic detection implementations described herein). A 5-tuple associated with the traffic flow may be unknown by the network. The UE may issue an alert to the network. The alert may indicate to the network that the traffic flow has been detected. The UE may determine the 5-tuple associated with the traffic flow. The UE may report the 5-tuple to the network. The report may be in response to one or more of: a request received from the network requesting traffic flow information; or, a determination that a first policy condition has been met.

18 Claims, 13 Drawing Sheets

(58) Field of Classification Search
CPC .... H04L 47/803; H04L 47/805; H04W 28/10; H04W 8/02
USPC .................................................. 370/235, 252
See application file for complete search history.

(56) References Cited

U.S. PATENT DOCUMENTS

| | | | | |
|---|---|---|---|---|
| 2010/0268763 | A1* | 10/2010 | Rasanen | 709/203 |
| 2011/0047620 | A1 | 2/2011 | Mahaffey et al. | |
| 2012/0188949 | A1* | 7/2012 | Salkintzis et al. | 370/329 |
| 2012/0198081 | A1* | 8/2012 | Zhao | 709/227 |
| 2012/0264412 | A1* | 10/2012 | Tervonen | H04W 48/08 455/418 |
| 2013/0034019 | A1* | 2/2013 | Mustajarvi | 370/254 |
| 2013/0208696 | A1* | 8/2013 | Garcia Martin | H04W 36/32 370/331 |
| 2015/0244731 | A1 | 8/2015 | Yu | |

OTHER PUBLICATIONS

3rd Generation Partnership Project (3GPP), TR 23.8xy V0.1.0, "3rd Generation Partnership Project; Technical Specification Group Services and System Aspects; Data Identification in ANDSF (DIDA); (Release 11)", Apr. 2011, 8 pages.

3rd Generation Partnership Project (3GPP), TS 23.203 V11.1.0, "3rd Generation Partnership Project; Technical Specification Group Services and System Aspects; Policy and charging control architecture (Release 11)", Mar. 2011, 139 pages.

3rd Generation Partnership Project (3GPP), TS 24.302 V10.3.1, "3rd Generation Partnership Project; Technical Specification Group Core Network and Terminals; Access to the 3GPP Evolved Packet Core (EPC) via non-3GPP access networks; Stage 3 (Release 10)", Apr. 2011, 57 pages.

3rd Generation Partnership Project (3GPP), TS 24.312 V10.1.0, "3rd Generation Partnership Project; Technical Specification Group Core Network and Terminals; Access Network Discovery and Selection Function (ANDSF) Management Object (MO) (Release 10)", Dec. 2010, 95 pages.

3rd Generation Partnership Project (3GPP), TS 24.312 V10.2.1, "3rd Generation Partnership Project; Technical Specification Group Core Network and Terminals; Access Network Discovery and Selection Function (ANDSF) Management Object (MO) (Release 10)", Apr. 2011, 153 pages.

3rd Generation Partnership Project (3GPP), TSG SA SP-110084, "New WID for Data Identification in ANDSF", 3GPP TSG SA WG2 Meeting #51, Kansas City, USA, Mar. 21-23, 2011, 5 pages.

Open Mobile Alliance (OMA), OMA-TS-DM_RepPro-V2_0-20101011-D, "OMA Device Management Representation Protocol," Draft Version 2.0, Oct. 11, 2010, 76 pages.

International Search Report and Written Opinion for corresponding PCT/US2012/044598, Sep. 20, 2012, 13 pages.

* cited by examiner

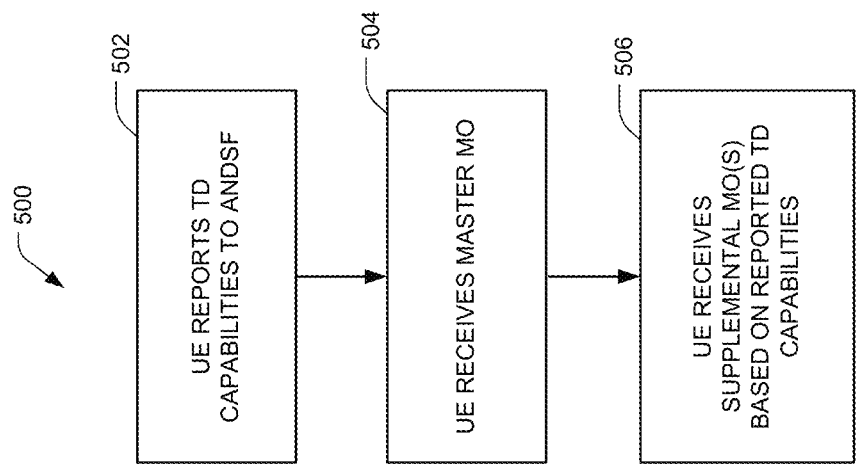
FIG. 5
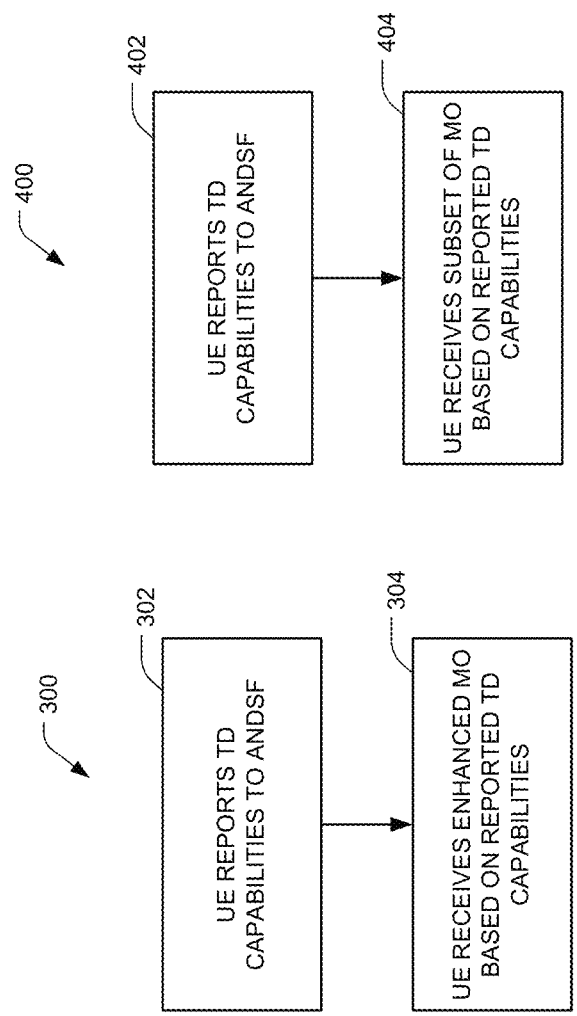
FIG. 4
FIG. 3

MANAGING DATA MOBILITY POLICIES

CROSS-REFERENCE TO RELATED APPLICATIONS

This application claims the benefit of U.S. Provisional Patent Application No. 61/502,105, filed on Jun. 28, 2011, the contents of which are hereby incorporated by reference herein.

BACKGROUND

Access Network Discovery and Selection Function (ANDSF) may refer to an entity within an Evolved Packet Core (EPC) of the System Architecture Evolution (SAE) for 3GPP compliant mobile networks. ANDSF may assist User Equipment (UE) in the discovery of non-3GPP access networks, such as Wi-Fi, or WIMAX, for example, that may be used for data communications in addition to 3GPP access networks (e.g., HSPA or LTE). ANDSF may provide the UE with rules policing the connection to and usage of these networks, such as Inter-System Routing Policies (ISRP), e.g., via a management object (MO).

The ISRP provide the capability to identify traffic based on types of information, including extrinsic information available to the UE, such as the APN, and IP packet header information (e.g., transport protocol, destination port and destination IP address). Additional enhancements to ANDSF may include enabling traffic identification based on throughput (e.g., identifying traffic based on the total amount of data they are sending/receiving); application (e.g., identifying traffic based on application ID/name/etc.); content type (e.g., identifying traffic based on the type of content (e.g. video, audio, data, control, etc.); and destination domain (e.g., identifying traffic based on the destination domain, such as the fully qualified destination name (FQDN) in the web request).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and instrumentalities are disclosed to communicate traffic flow information to a network. A user equipment (UE) may detect a traffic flow (e.g., using one or more of the traffic detection implementations described herein). A 5-tuple associated with the traffic flow may be unknown by the network. The UE may issue an alert to the network. The alert may indicate to the network that the traffic flow has been detected. The alert may be triggered for issue to the network when one or more of the following occurs: an application name is associated with the traffic flow; a traffic type is associated with the traffic flow; or when an element of the traffic flow relates to an alert generating element in an access network discovery selection function (ANDSF) management object (MO). The UE may determine the 5-tuple associated with the traffic flow. The UE may report the 5-tuple to the network. The report may be in response to one or more of: a request received from the network requesting traffic flow information; or, a determination that a first policy condition has been met.

The UE may associate the traffic flow with a timer. The UE may remove a reference to the traffic flow when the timer expires. The reference may be created and/or located in an ANDSF MO. The reference may be a leaf in an IPFlow sub-tree.

The UE may receive an ANDSF MO comprising a policy for the UE to apply to the detected traffic flow. The UE may redirect the traffic flow from a first IP address to a second IP address according to a second policy condition. To redirect the traffic flow, the UE may intercept an IP packet associated with the traffic flow and replace the first IP address with the second IP address. The first IP address may be a destination IP address included in the IP packet when received at the UE.

BRIEF DESCRIPTION OF THE DRAWINGS

A more detailed understanding may be had from the following description, given by way of example in conjunction with the accompanying drawings wherein:

FIG. 3 illustrates an exemplary UE reporting;

FIG. 4 illustrates an exemplary UE reporting;

FIG. 5 illustrates an exemplary UE reporting;

DETAILED DESCRIPTION

A detailed description of illustrative embodiments may now be described with reference to the figures. However, while the present invention may be described in connection with exemplary embodiments, it is not limited thereto and it is to be understood that other embodiments may be used or modifications and additions may be made to the described embodiments for performing the same function of the present invention without deviating therefrom.

Figure 1A:
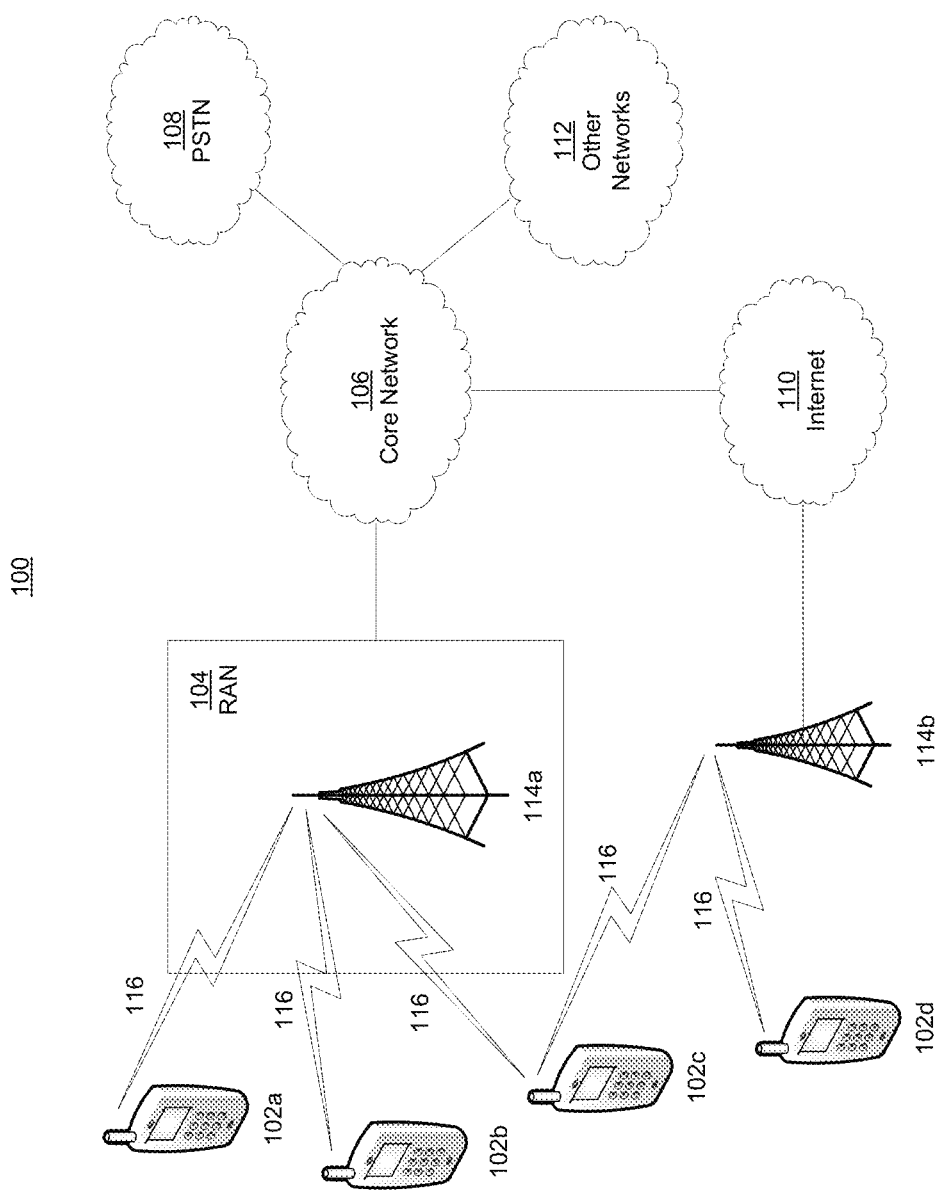
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
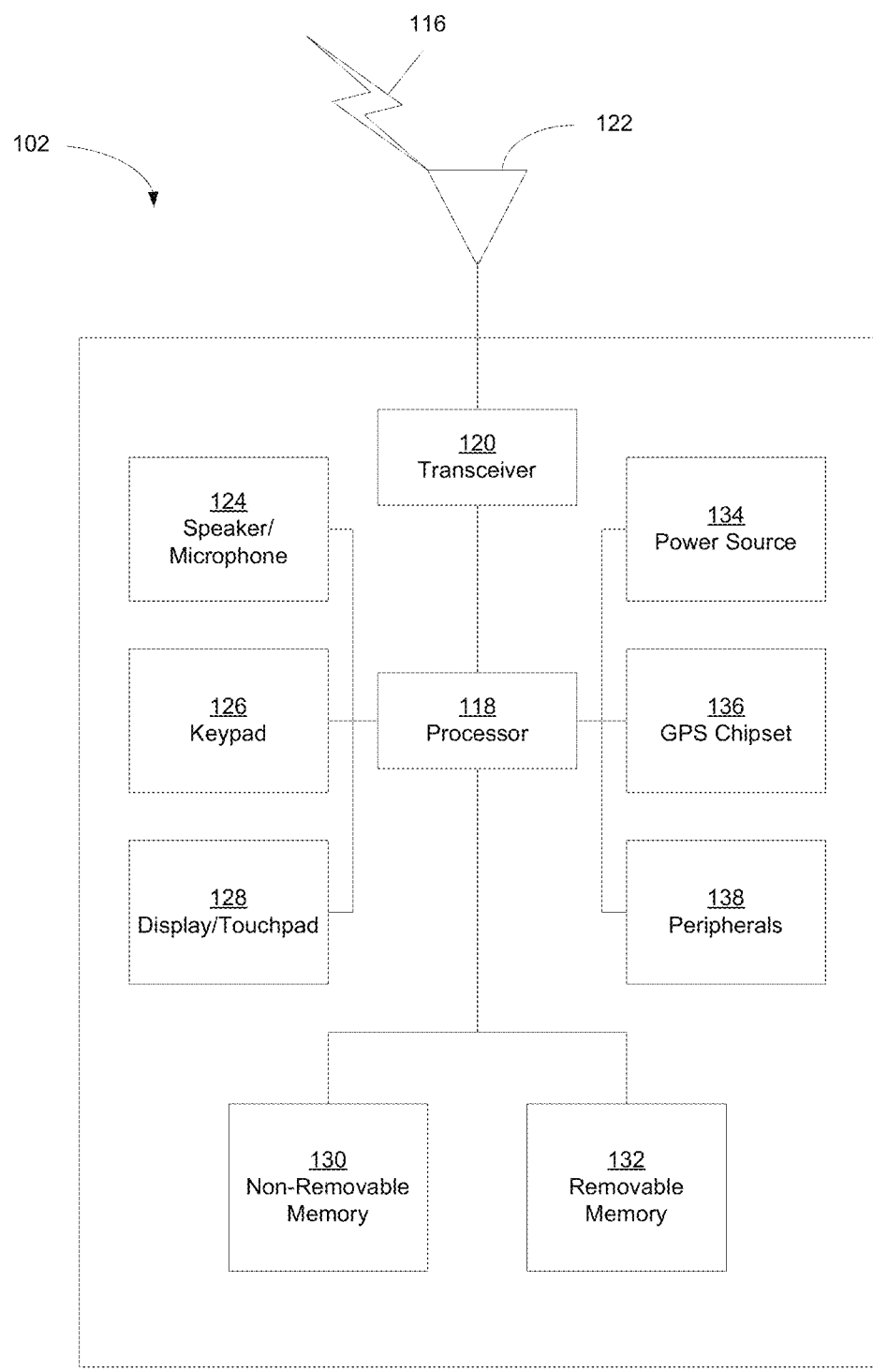
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
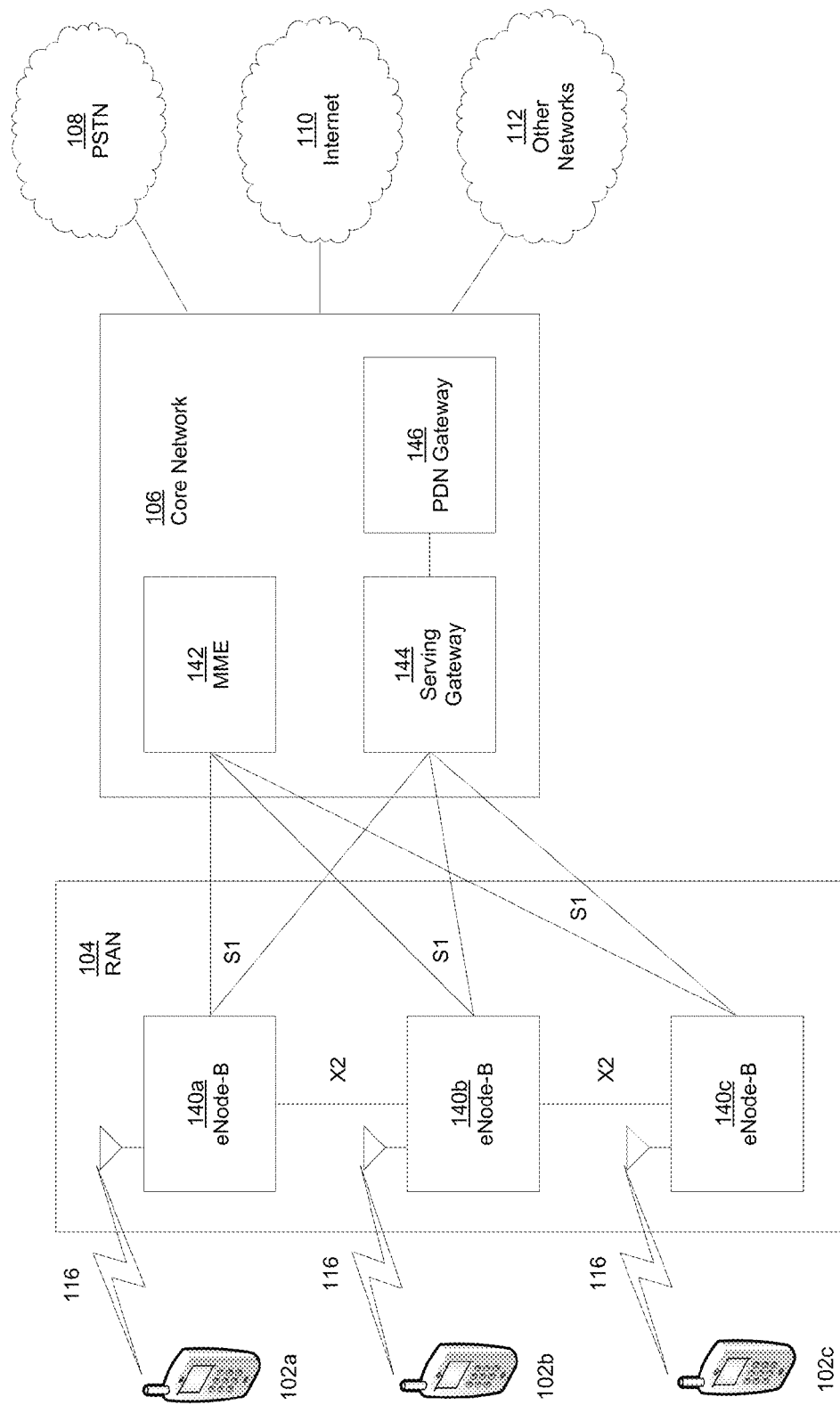
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Techniques identified under the Data Identification in Access Network Discovery and Selection Function (DIDA) study item may improve the data identification capabilities of UEs, e.g., for the purposes of improved management of network resources. The initial draft of the 3GPP TR 23.855, "Data Identification in ANDSF (DIDA) (Release 11)," v. 0.1.0, 04/2011, which is hereby incorporated by reference herein, provides an overview of the DIDA work item.

Inter-System Routing Policies (ISRP) enhancements in ANDSF policy management may provide the capability to identify traffic based on the following types of information: Access Point Name (APN), and/or IP packet header information (e.g., the transport protocol, destination port and destination IP address). 3GPP TS 24.302, "Access to the 3GPP Evolved Packet Core (EPC) via non-3GPP access networks; Stage 3 (Release 10)," v. 10.3.1, 04/2011 and 3GPP TS 24.312, "Access Network Discovery and Selection Function (ANDSF) Management Object (MO) (Release 10)," v. 10.2.1, 04/2011, which are hereby incorporated by reference herein, may provide details on ANDSF operation, the structure of the ANDSF MO, and how a policy is provided to a UE.

DIDA may develop ANDSF enhancements to enable traffic identification based on one or more of the following: throughput (e.g., identifying traffic based on a total amount of data the UE is sending and/or receiving); application (e.g., identifying traffic based on application ID and/or name, etc.; content type (e.g., identifying traffic based on the type of content (e.g., video, audio, data, control, etc.)); or destination domain (e.g., identifying traffic based on the fully qualified destination name (FQDN) in the web request).

DIDA may define changes to ANDSF and specifically to ANDSF MO to carry this information. The ANDSF protocol may be limited, and, with the introduction of ISRP, the ANDSF MO may be excessively large, which may introduce challenges to the Open Mobile Alliance (OMA) Device Management (DM) framework.

ANDSF may be a relatively basic protocol, which may support one or more of the following: ANDSF MO push to the UE, which may be implemented using the means suggested for the push by OMA DM specs (e.g., via SMS), or ANDSF MO pull by the UE, which may be implemented using an ANDSF query and/or ANDSF response set of messages. The ANDSF query may carry a "Generic Alert" message, while the ANDSF response may use OMA server commands to build a requested subset of the ANDSF MO. OMA DM capabilities may be utilized. OMA DM capabilities may allow for a variety of functionality, such as UE changing and/or updating values in the ANDSF MO, which the network may retrieve via the Get/Results OMA DM exchange. The OMA DM capabilities may allow for the UE to use an OMA DM Alert message to cause an action by the ANDSF Server. In the Pull Mode the UE may request information from ANDS and the UE may update ANDSF as to its location as defined in the appropriate leaf nodes of the ANDSF MO. A "Generic" ALERT may be used for this purpose. Neither the OMA nor the 3GPP specifications referenced herein may use the Generic Alert specified for the purposes of providing information to ANDSF. SOAP-XML may be utilized for the transport of the ANDSF MO (e.g., instead of OMA DM). OMA DM may be a one-way protocol and may require the use of "Generic" ALERT for UE-to-Network communication; SOAP-XML may be a 2-way protocol. This may simplify UE-to-network communication.

The ANDSF MO may be relatively large, e.g., it may be 1-2 orders of magnitude larger than other OMA DM MOs. The size of the ANDSF MO may generate implementation concerns on the client and/or the server side, e.g., many implementations may support a small sub-set of the elements defined. DIDA may further increase the size of the ANDSF MO, with each traffic management type potentially adding an ISRP-sized sub-tree to the MO (e.g., the ISRP sub-tree is roughly 100 information elements). UEs may be limited to supporting a subset of traffic identification types, e.g., the overhead of delivering a large MO to the UE may be wasted, as may be the overhead of processing and storing it at the server and the UE. Operators and equipment providers may decide to support the full DIDA-enhance MO. This may cause technical problems related to overhead and implementation complexity, as well as scalability. Operators may decide which traffic identification types (e.g., a limited set of traffic identification types) it wants to support and require equipment providers to support such a set. This may lock operators into policy design decisions that may prevent them from effectively responding to the changing market needs.

Traffic identification types may be supported by ANDSF or may be added, e.g., as a result of DIDA enhancements. UE identification of traffic may vary from device to device. Exemplary traffic identification techniques may include one or more of the following.

IP packet header inspection may be a traffic identification technique. IP packet header inspection may be implemented in the kernel space of a typical UE OS. IP packet header inspection may identify traffic based on the information in the header of the IP packet. IP packet header inspection may involve a user-plane filter that may need to look at each IP datagram; this operation may be needed to support per-flow operation (e.g., IFOM).

L4 (e.g., TCP/UDP) traffic monitoring may be a traffic identification technique. L4 traffic monitoring may be capable of looking at L4 traffic, for example to obtain statistics (e.g., throughput, congestion, etc.). L4 traffic monitoring may be implemented in the kernel space of a typical UE OS.

Application monitoring may be a traffic identification technique. Application monitoring may use OS provided capability(ies) to match active applications with active sockets. The sockets may be matched to the IP flows. Application monitoring may be a relatively low complexity application which may be implemented in user space on the device (e.g., which may assume some interface capability by the OS).

A 3GPP-specific application interface may be a traffic identification technique. This may be a 3GPP-specific application interface, which may allow applications to specify things such as the type of traffic to be used (e.g., QoS Class), multimedia codec used, etc.

Packet Inspection may be a traffic identification technique. This may be a set of techniques, e.g., Deep Packet Inspection (DPI), that may look inside IP traffic to provide identification of the traffic in the packet. These techniques may be generally designed for network-operations, such as firewalls and Traffic Detection Functions (TDFs) for the core network. These may be of high complexity. The depth to which packet inspection may be needed may variable. For example, determining what application protocol is used (e.g., FTP vs. HTTP vs. something else) and finding FQDN from a DNS exchange (and, for example, detecting the exchange with a larger stream of IP traffic) may require some complexity. Separating traffic of a content type or coded by a particular codec which may be embedded into a broader IP flow may need a different level of inspection. As used herein, a distinction may be made between "superficial" packet inspection techniques and deep packet inspection techniques, which may encompass different and/or incompatible techniques.

Table 1 illustrates an exemplary list of traffic identification types.

TABLE 1

| | IP Packet header inspection | L4 Traffic Monitoring | Application Monitoring | 3GPP-Specific Application Interface | Superficial Packet Inspection | Deep Packet Inspection |
|---|---|---|---|---|---|---|
| APN Name | X | | | X | | |
| IP Header (i.e., the 5-tuple) | X | | | | | |
| Throughput | X | X | | | | |
| Application Name/ID | X | | X | X | | |
| Content Type | X | | | X | | X |
| FQDN | X | | | | X | X |
| Protocol | X | | X | | X | X |
| Codec | X | | | X | | X |

The traffic detection types supported by a technique may vary. A UE may implement the set or a subset of the traffic detection techniques. The functionality of the UE may depend on what kind(s) of traffic detection it is capable of performing. In accordance with various embodiments, the relationships between exemplary traffic detection types (rows) and exemplary traffic detection techniques (columns) are illustrated in Table 1, where "X" may indicate that the technique may support the traffic detection type (e.g., at least to some extent).

By way of example, consider identifying FTP flows, which may be an example of protocol detection or perhaps content type if the file download and not FTP is of interest. Using IP packet header inspection, some "active" FTP flows may be identified by looking for TCP and destination port 21 in the 5-tuple of the appropriate IP packets to identify the control flow, port 20 for the data portion. Application monitoring may be needed, e.g., once an application has been identified as using FTP to monitor the opening of connections. To maximize FTP traffic identification, superficial packet inspection may be needed. As indicated in Table 1, at least some DPI techniques may handle this functionality. Identification of passive FTP flows may need deep packet inspection, e.g., these types of flows may tend to use ports selected during the session, and for example, the FTP session may need to be inspected to "catch" such assignment. If identifying file download sessions is desired, the application may declare that it needs a connection for the purposes of download (e.g., 3GPP-Specific Application Interface). If determining the amount of data that FTP can potentially pump through, throughput monitoring of TCP using L4 traffic monitoring may be performed.

Even for a relatively simple traffic detection case (e.g., FTP), the type of traffic identification that the UE may perform may be a complex "intersection" of what the network may need and what the UE may deliver. As the scenarios increase in complexity (e.g., video, including embedded video, multiple flows, etc.) the environment may become more complex. An attempt to cover each possible combination within a single "common" MO may result in defining an MO that may be too large.

Systems, methods, and instrumentalities described herein may relate to management of MO's, such as relatively large MO's, e.g., related to DIDA. A UE may report, or otherwise provide its traffic detection capabilities to ANSF, and receive a subset of the MO in return. The UE may request information from ANDSF based on its traffic detection capabilities and receive a subset of the MO in return. The subset of the MO may comprise a master MO and one or more supplemental MOs, e.g., as described herein.

Figure 2A:
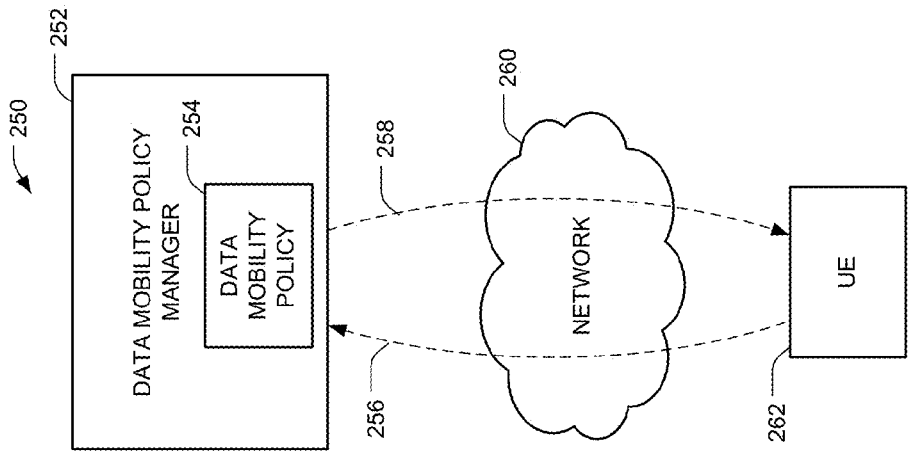
FIGS. 2 and 2A illustrates exemplary mobile communications.
Figure 2:
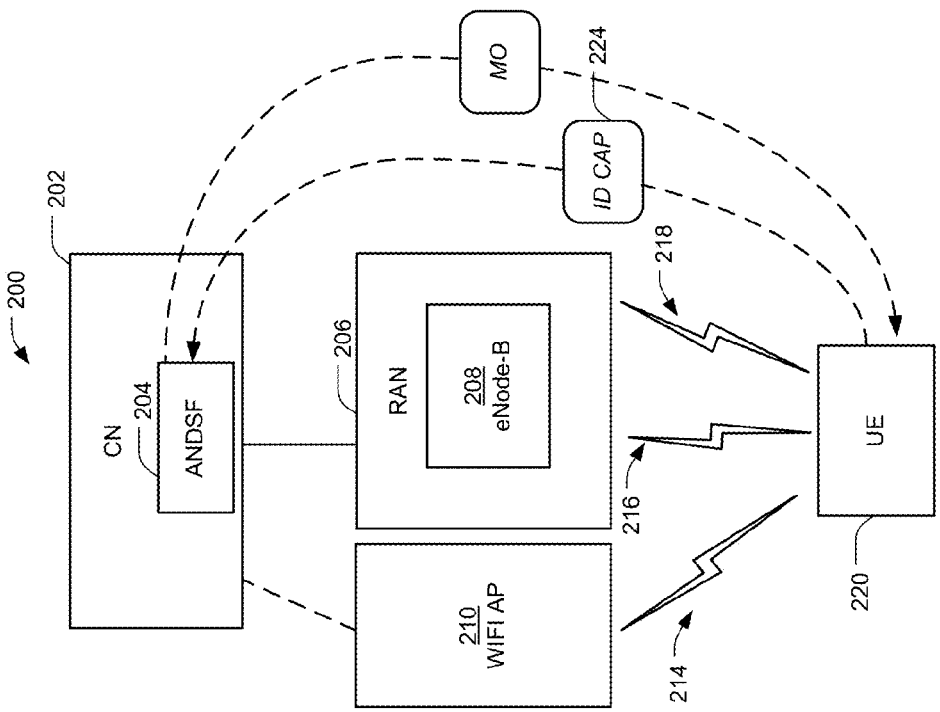

FIG. 2 illustrates an exemplary mobile communications architecture 200 in which one or more disclosed embodiments may be implemented. As illustrated, user equipment 220 is in communication with a core network 202 via a radio access network (RAN) 206. RAN 206 may be a 3GPP RAN similar to RAN 104 in FIG. 1C and may comprise an eNode-B 208. The mobile communications architecture 220 may comprise a Wifi Access Point 210 or other non-3GPP wireless access technologies. As an example, the mobile communications architecture 220 may comprise WiMax access technologies, Bluetooth access technologies, and/or television whitespace access technologies, which may be collectively referred to as a non-3GPP RAN. The WiFi Access Point 210 and/or other non-3GPP wireless access technologies may be combined or integrated with the eNode-B 208 to form a converged gateway architecture. The UE 220 may be in communication with, or at least capable of communicating with, the RAN 206 and the WiFi Access Point 210 via multiple radio access technologies (RATs). As illustrated, the UE 220 may communicate with the WiFi Access Point 210 via a first RAT 214 and the RAN 206 via a second RAT 216 and a third RAT 218. The ANDSF 204 of the core network 202 may define the policies and procedures defining which RATs are available to the UE and which types of traffic may be sent via which RAT (e.g., data mobility policies). The UE 220 may communicate with the ANDSF 204 (e.g., over the S14 reference point) during an initialization process and/or throughout a session. Communications between the UE 220 and the ANDSF 204 may pass through the RAN 206.

As illustrated in FIG. 2, the communication from the UE 220 to the ANDSF 204 may indicate the traffic identification capabilities 224 of the UE 220. An MO 220 may be sent to the UE 220. The MO 220 may be a subset of a larger MO, and may be a collection of multiple MOs. The MO 220 received by the UE 220 may be customized, enhanced, or otherwise tuned, e.g., so that it is relevant to the traffic identification capabilities of that particular UE 220.

The UE 220 may supply its traffic identification capabilities to the ANDSF 204 in a variety of ways. The ANDSF protocol, which may exist as an envelope to the OMA DM framework, may be enhanced to enable the UE to report its capabilities. The OMA DM framework may be used to enable the UE to report its capabilities. The ANDSF MO may be structured so that the UE may request the portion of the MO that it needs, e.g., reporting its capabilities "implicitly."

The mechanisms described herein may be described in the context of an ANDSF MO, however, the mechanisms are not limited thereto. The mechanisms described herein may be used in a variety of implementations beyond the ANDSF and/or MOs. FIG. 2A illustrates an exemplary mobile communications architecture 250. A UE 262 may be in communication with a Data Mobility Policy Manager 252 via a network 260. The Data Mobility Policy Manager 252 may be similar to ANDSF, or other suitable policy manager or entity. The Data Mobility Policy Manager 252 may maintain a Data Mobility Policy 254. The Data Mobility Policy 254 may generally define the policies and/or mechanisms that UEs associated with the Data Mobility Policy Manager 252 may utilize for IP flow management. The Data Mobility Policy 254 may be similar to an MO, or other suitable policy or collection of policies. Via a UE communication 256, the UE 262 may provide the Data Mobility Policy Manager 252 with its traffic detection capabilities. The traffic detection capabilities of the UE 262 may vary over time, such as during different operational modes (e.g., operating on reserve power). The UE 262 may send updates, or otherwise modify its traffic detection capabilities over time. Responsive to the UE communication 256, the Data Mobility Policy Manager 252 may send a Data Mobility Policy Manager communication 258 that may include policy information to the UE 262. The specific policy information included in the Data Mobility Policy Manager communication 258 may be dependent on the traffic detection capabilities reported by the UE 262. The policy information may be a subset of the Data Mobility Policy 254, where policies sent to UE 262 may be limited to policies relevant to the UE's capabilities.

The UE may reports its traffic identification capabilities to ANDSF (e.g., FIGS. 3-5). This reporting may be done as part of the ANDSF query or as a separate message, for example. The capabilities may include, for example, traffic identification techniques supported by UE. In the case of packet inspection, packet inspection algorithm(s) supported may be provided to the ANDSF by the UE. Based on this information, ANDSF may transmit the information that can be used by the UE. FIG. 3 illustrates an exemplary flow chart 300 of UE reporting. At 302, the UE may report its traffic detection capabilities to the ANDSF. The traffic detection capabilities may include, for example, IP packet header inspection, packet inspection, L4 traffic monitoring, etc. At 304, the UE may receive an enhanced MO based on its reported traffic detection capabilities. As discussed herein, the enhanced MO may be limited to including traffic management policies and procedures relevant to the capabilities reported to the ANDSF. The "enhanced" MO may be generated using any suitable technique.

FIG. 4 illustrates an exemplary flow chart of UE reporting, where a subset of the MO may be provided to the UE. The ANDSF MO may be extended to include information for a large number of traffic detection capabilities to form a relatively large ANDSF MO. The UE may report its traffic detection capabilities at 402. The UE may receive a subset of the large ANDSF MO at 404.

FIG. 5 illustrates an exemplary flow chart of UE reporting, where the enhanced MO may be a collection of two or more MOs. At 502, the UE may report its traffic detection capabilities to ANDSF. At 504, the UE may receive a master MO. The master MO may include, for example, information that is independent on the UE's traffic detection capabilities. At 506, the UE may receive additional (e.g., supplemental) MOs that may be relevant to the UE's traffic detection capabilities and the needs of traffic identification, e.g., per the master MO.

Figure 6:
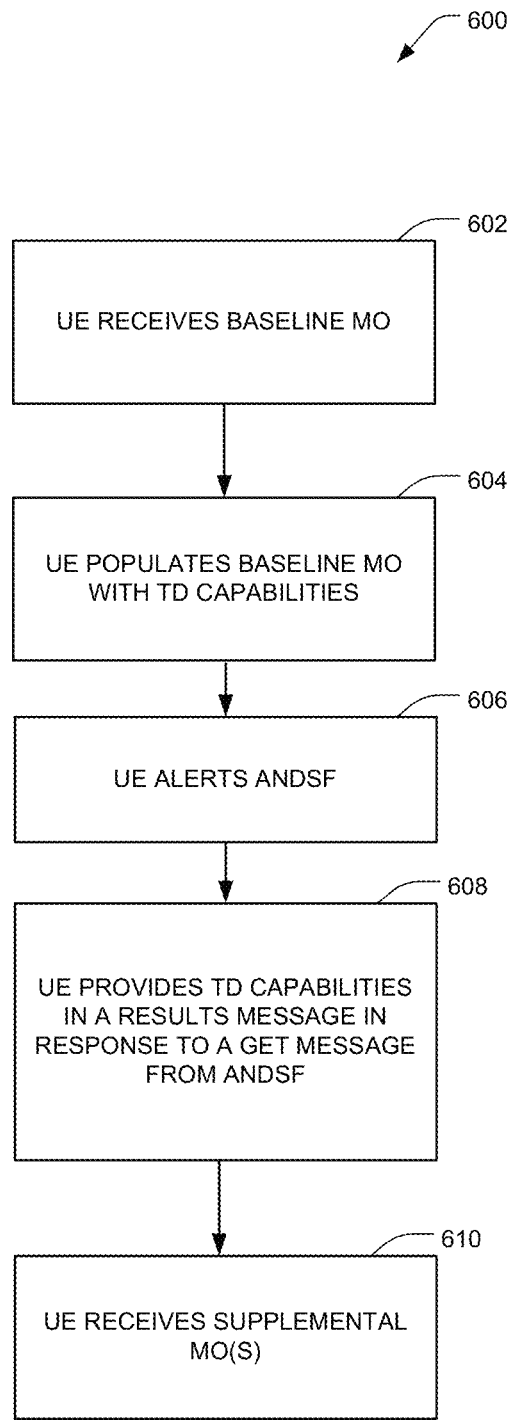
FIG. 6 illustrates an exemplary UE reporting.
Figure 7:
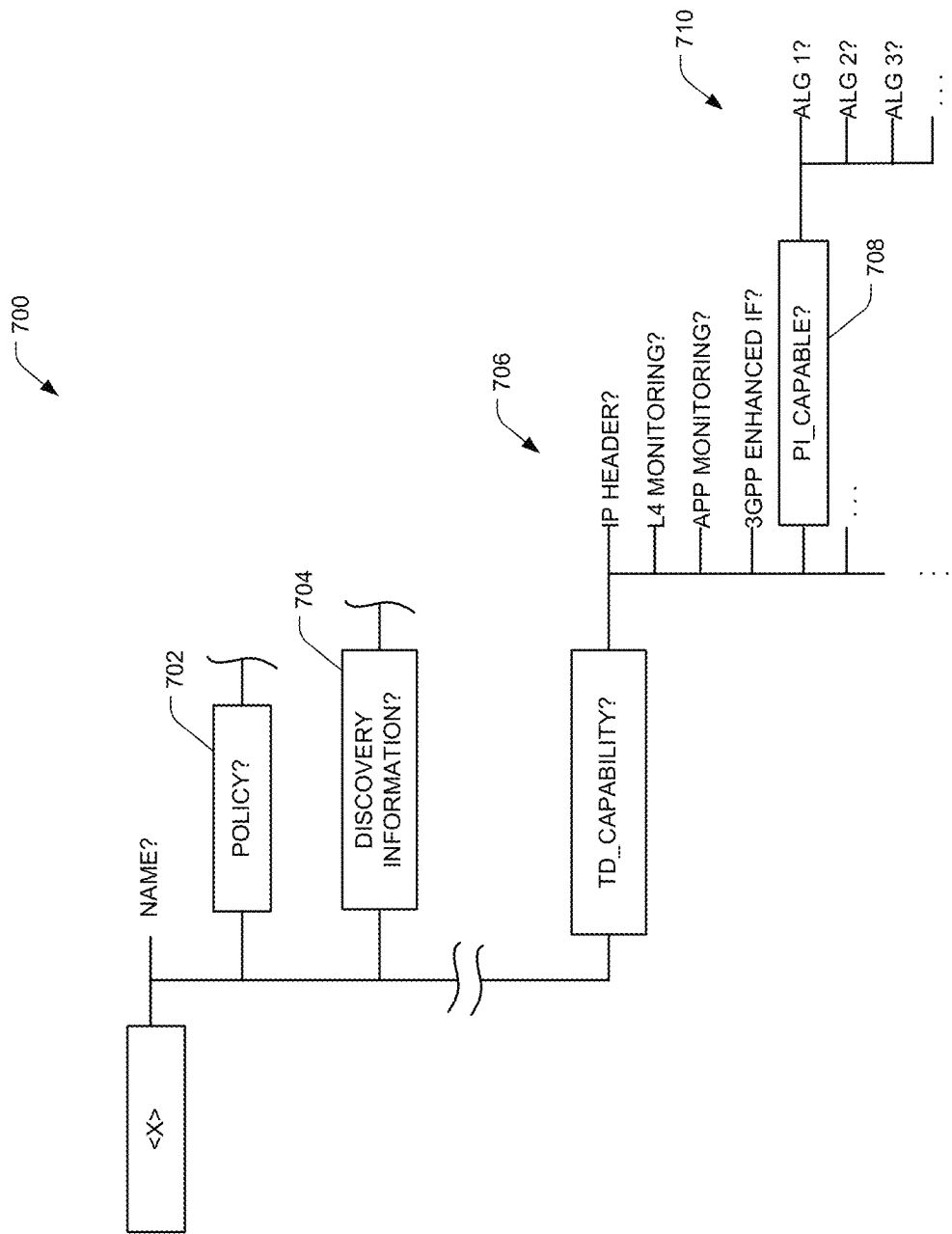
FIG. 7 illustrates an exemplary portion of a baseline management object (MO)

A UE may report its traffic detection capabilities using the ANDSF framework. FIG. 6 illustrates an exemplary flow chart 600 of UE reporting. At 602, the UE may be provided with a baseline MO. The baseline MO, which may be similar to the master MO described herein, may be provided to the UE, e.g., when the UE initiates a session, for example, as per section 4 of 3GPP TS 24.312 (e.g., using a "generic alert"). FIG. 7 illustrates an exemplary portion of a baseline MO 700, which may include a tree structure comprising a variety of nodes and leaves. The policy node 702 may provide the UE with one or more rules that may prioritize the available access networks (ANs). The discovery information node 704 may provide the UE with information about available ANs. The discovery information node 704, for each available AN, may inform the UE about the type of that AN (e.g., via an AccessNetworkType leaf) and the geographic areas where the AN may be expected to be available (e.g., via the AccessNetworkArea node). The baseline portion may be limited to the existing policy sub-tree (e.g., policy node 702 and discovery information node 704) and a traffic detection (TD) capability sub-tree 706.

The UE may fill in the TC capability sub-tree 706 with its own capabilities at 604, e.g., upon receiving the baseline MO 700 with the TC capability sub-tree 706. A number of traffic detection capabilities may be illustrated in FIG. 7 (e.g., IP Header, L4 Monitoring, etc.), however, implementations are not limited thereto; different traffic detection capabilities in the TD capability sub-tree 706 may be used. The TD capability sub-tree 706 is illustrative and not limiting. Various nodes may be included in the TD capability sub-tree 706, such as PI_Capable node 708. Nodes similar to PI_Capable node 708 may define various leaves 710 to help identify the traffic detection capabilities of the UE. Leaves 710 may comprise various packet inspection algorithms.

Referring to FIG. 6, at 606 the UE may notify the ANDSF that information has been provided. A "generic alert" may be utilized to alert the ANDSF that information has been provided. The ANDSF may wait for a period of time and then poll the UE for this information. At 608 the traffic detection capability of the UE may be provided to the ANDSF. ANDSF may use a "Get" command to read the values from the TD capability sub-tree 706 (e.g., FIG. 7), where the UE may provide the information in a "Results" message. At 610, based on the message received from the UE, the ANDSF may send additional information that may be required by the UE in view of the reported traffic detection capabilities.

Figure 8:
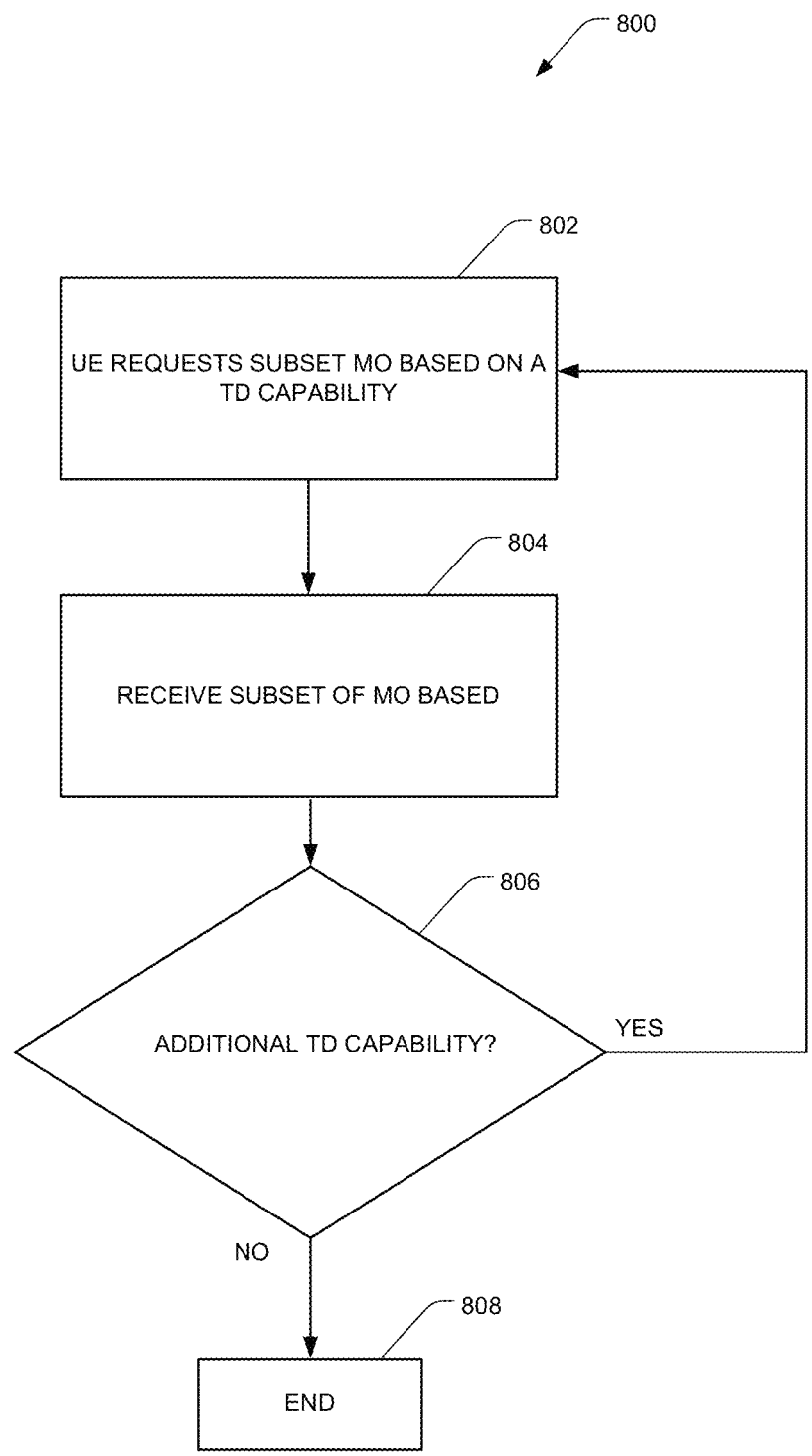
FIG. 8 illustrates an exemplary UE reporting.

The UE may request relevant information from ANDSF based on its traffic detection capabilities, e.g., reporting its TD capabilities implicitly. A sub-tree of the ANDSF MO may be defined for each traffic detection capability. The UE may request the relevant portion of the ANDSF MO, e.g., that it may need pursuant to its traffic detection capabilities. FIG. 8 illustrates an exemplary flow chart 800 of a reporting. At 802, the UE may request the relevant component of the ANDSF MO pertaining to one of its traffic detection capabilities. A Generic Alert, e.g., as defined in Section 4 of 3GPP TS 24.312, may be used with the "Type" value set to the appropriate sub-tree. At 806, the UE may determine if it has additional traffic detection capabilities. If so, additional requests may be generated to fully cover the UE's capabilities.

Figure 9:
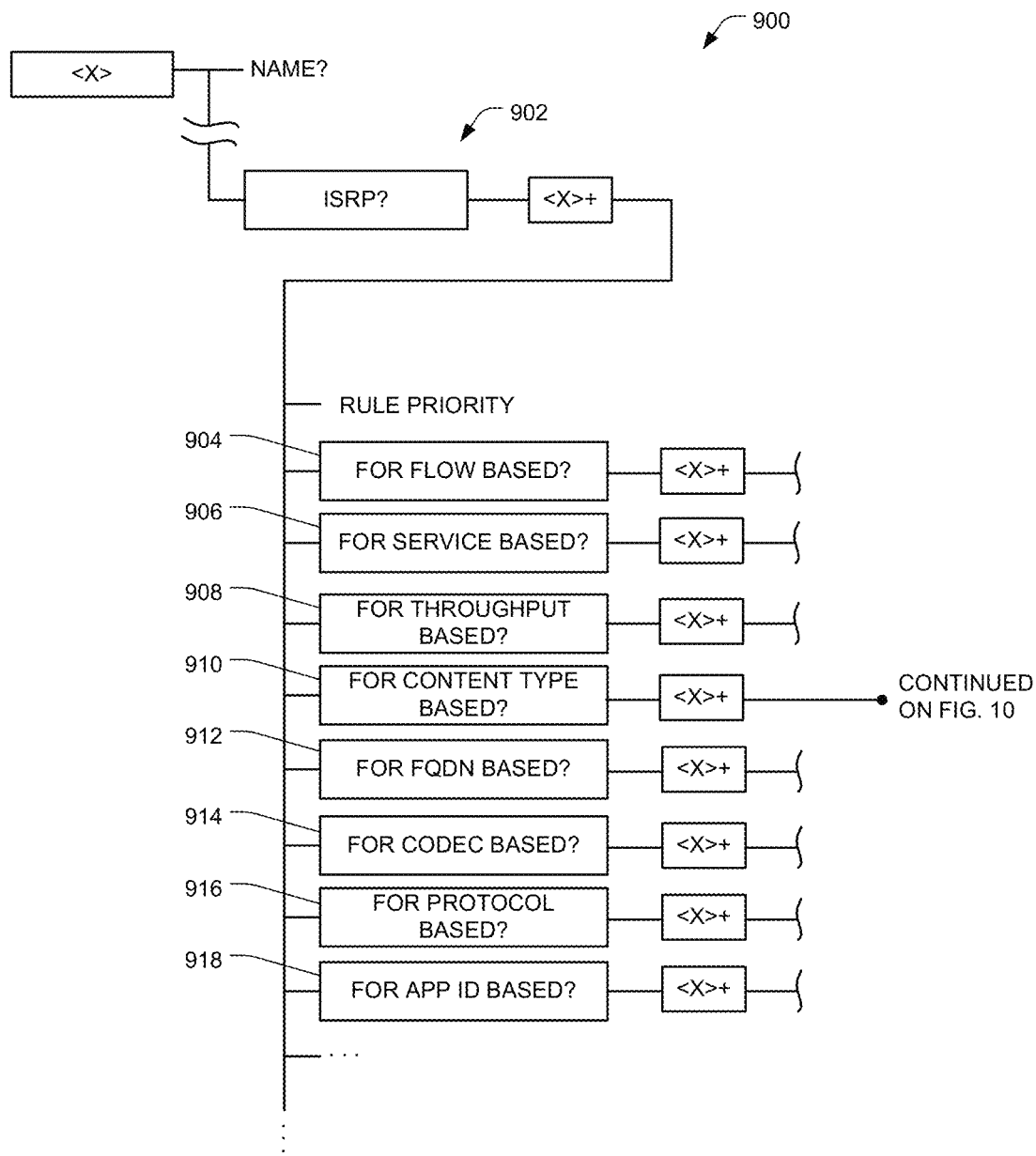
FIGS. 9-10 illustrates an exemplary portion of a management object (MO)
Figure 10:
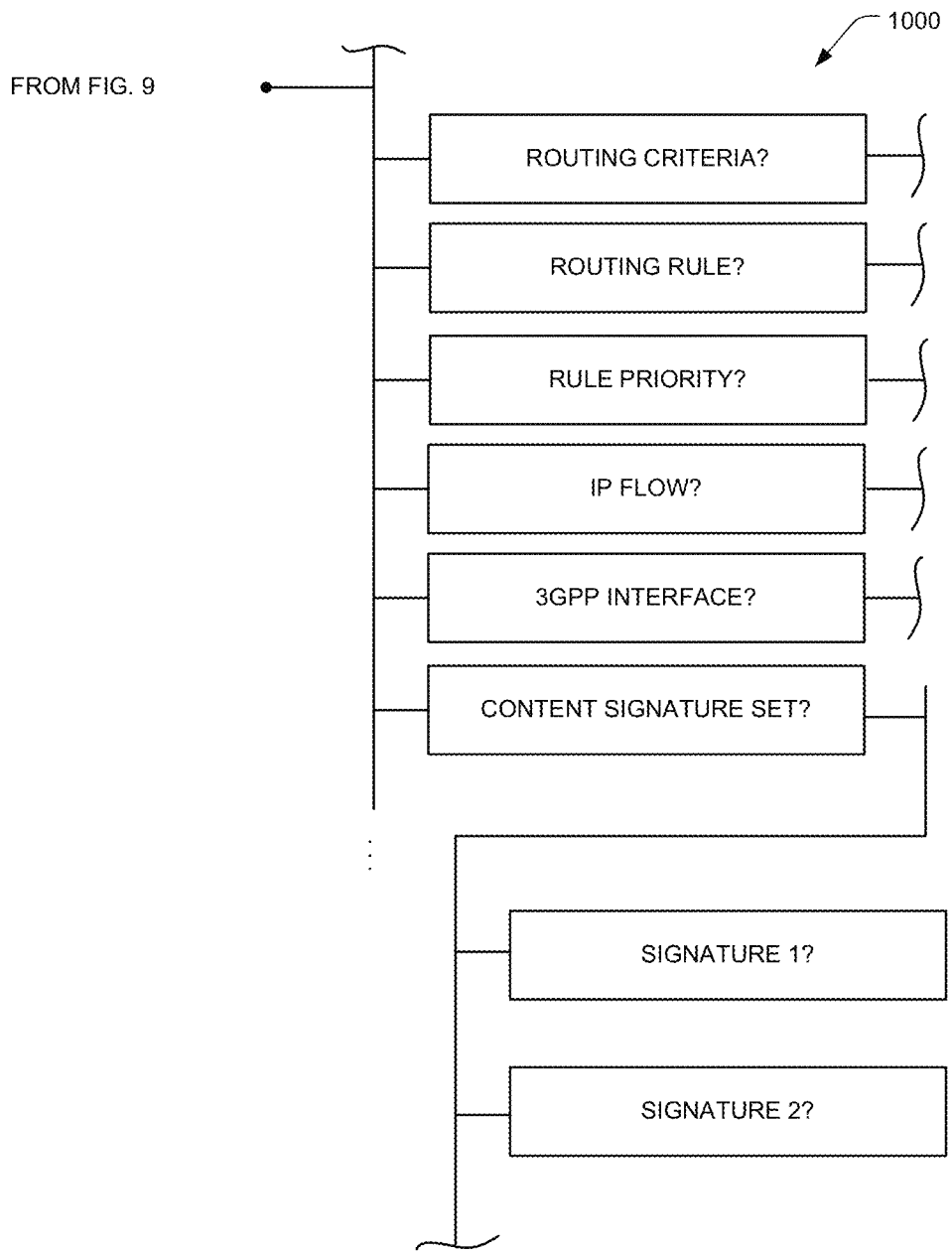

FIGS. 9 and 10 may illustrate an exemplary portion of a management object (MO). With reference to FIG. 9, the ANDSF MO 900 (e.g., a portion of which is illustrated in FIG. 9) may be structured in a way to make it easy for the UE to request the relevant information at 802 (FIG. 8). Such structure may reduce overhead in both communication and processing. The ISRP section 902 of the ANDSF MO 900 may be extended to include additional nodes corresponding to the various traffic detection capabilities. The ANDSF MO 900 may include a TD capabilities sub-tree similar to the TD capabilities sub-tree 706 illustrated in FIG. 7.

FIG. 9 includes TD type nodes 904-918, which may correspond to various rows of Table 1. The For Flow Based node 904 may correspond to the IP Header row in Table 1 and the Service Based node 906 may correspond to the APN name row in Table 1. TD type nodes 908-918 may correspond to other rows of Table 1. As is to be appreciated, the number of TD type nodes may increase as the number of TD types increase. Each TD type (e.g., row of Table 1) may be a new sub-tree of the ISRP sub-tree of the ANDSF MO. The mechanisms described herein may not be limited to augmenting the ISRP sub-tree of the ANDSF MO; other implementations may be used without departing from the scope of the present disclosure.

Each TD type node 904-918 may comprise the same policy elements. FIG. 10 illustrates exemplary policy elements 1000 of the For Content Type Based TD type node 910 (e.g., FIG. 9). Various embodiments may have different policy elements 1000. For each traffic identification type, additional sub-trees identifying other possible traffic flow identification techniques may be used. For example, For Content Type Based TD type node 910 may comprise the "RoutingCriteria," "RoutingRule," and "RulePriority" sub-trees which may be present throughout. For Content Type Based TD type node 910 may include "IPFlow" information associated with the IP header, which may be an optional or non-optional node. The Content Type Based TD type node 910 may include optional sub-trees that correspond to other detection types.

Each TD type node may comprise its own sub-tree with information for identification of the IP flow. For example the "ForFlowBased" sub-tree (e.g., not shown) may comprise an "IPFlow" sub-tree with 5-tuple information used to identify the flow. For some traffic identification types, an "IPFlow" subtree may be a required sub-tree as the information here (e.g., the 5-tuple) may serve as the IP Flow tag, e.g., even if identification is made by some other means. This information may be filled in by the UE after the identification is made, e.g., even if the 5-tuple may not have been used as the flow identification technique.

When a particular traffic identification technique may be used for multiple traffic identification types, the information may be duplicated in multiple sub-trees of the MO. If the UE requests the information individually for each traffic type sub-tree, multiple alerts may result and/or the information may be pushed to the UE whether it needs it or not. In order to reduce the use of multiple alerts virtual links may be used within the ANDSF MO. The TD Capability sub-tree may be used, with each capability leaf becoming a sub-tree comprising information needed for sub-flow identification using the particular approach. Because the TD capability sub-tree may be a single top-level sub-tree, the UE may be able to request information for its capabilities with one request per detection technique. Within each traffic type sub-tree, a virtual link to the appropriate sub-tree may be used for each appropriate traffic detection type policy.

Figure 11:
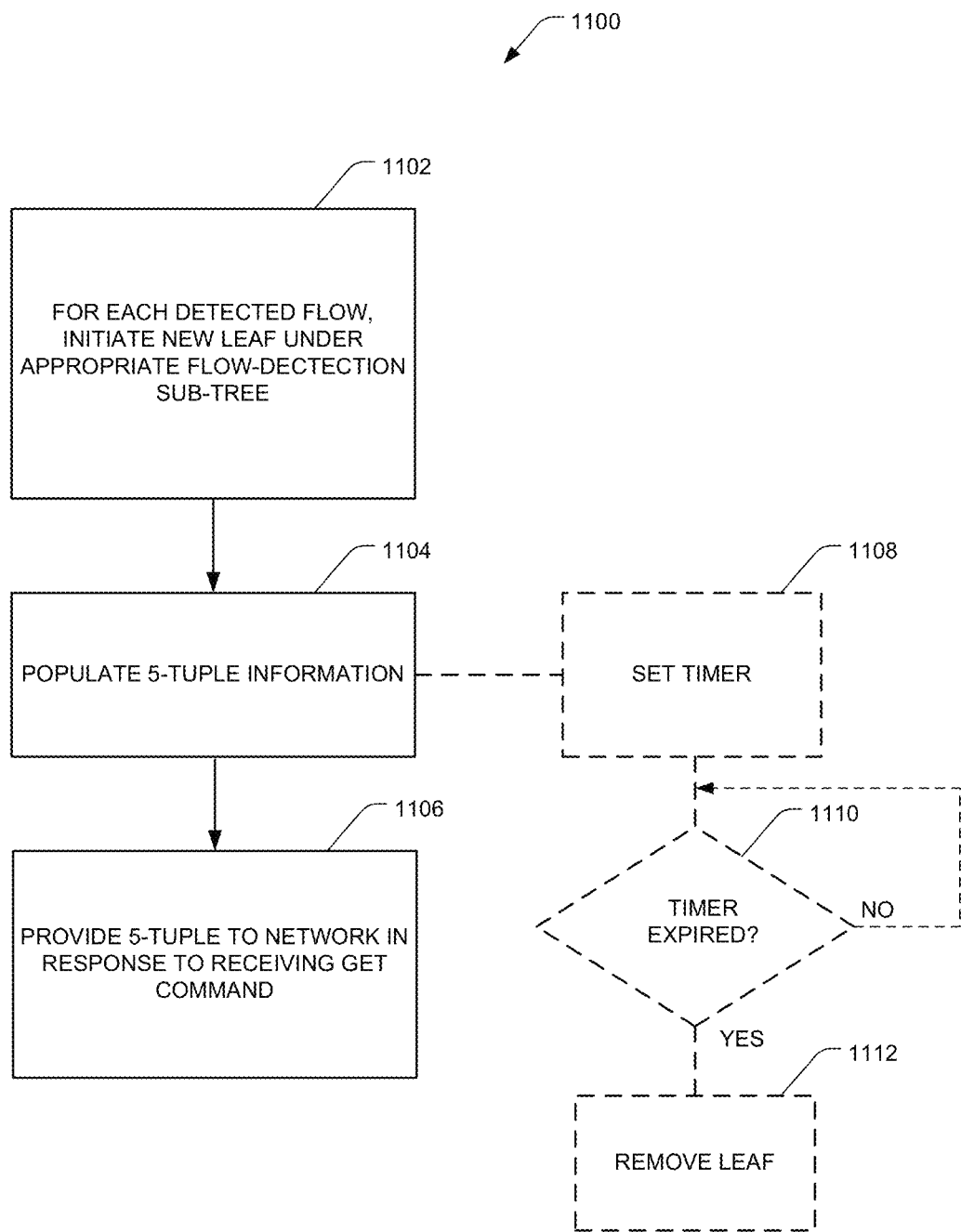
FIG. 11 illustrates an exemplary flow reporting.

The UE may report to the network the detected flow for each traffic detection type, e.g., once the UE has detected the IP flow. FIG. 11 illustrates an exemplary flow chart 1100 of a flow reporting. At 1102, for each detected flow, the UE may instantiate a new leaf, e.g., using the "<X>+" capability under the appropriate flow-detection type sub-tree. At 1104, the UE may populate the leaf with the 5-tuple information, e.g., under the "IPFlow" sub-tree. At 1106, the network may read this information, e.g., by using a "Get" and requesting this information for each detected flow or per detection type. The "Get" may be triggered internally within the network, or the UE may be configured to issue an Alert to the network whenever a new flow is detected, which may result in a "Get" from the network. The UE may report a detected UE flow using a "Generic" ALERT of a pre-defined type and placing the IP flow information into the ALERT message as payload. The specific method of reporting may be provisioned using a separate policy, which may be defined using an additional enhancement to the ANDSF MO.

A caching mechanism may be used to specify which previously observed flows have become too stale. This may be implemented, for example, since the list of identified flows changes with time and/or the instantiated leaf is, in theory, extensible forever. A timer may be associated with each new IP Flow sub-tree at 1108. At 1110, it may be determined if the timer has expired. If the timer has expired, the sub-tree may be pruned from the MO, e.g., at 1112. A specific value may trigger a network alert, e.g., an "application" name may trigger an alert from the UE to the network. This may be done by specifying "alert generating" elements in the MO or by other means (e.g. extending the ANDSF protocol to support such functionality).

Systems, methods, and instrumentalities may be disclosed relating to security extensions, e.g., EAP-SIM/AKA and IP-Sec. A Discovery Info node may be enhanced to include trust relationship information for the given access network. The node may be enhanced to include information on whether SIM-bootstrapped methods (e.g., EAP-SIM and/or EAP-AKA and/or EAP-AKA') may be used for authentication (e.g., seamless authentication).

Figure 12:
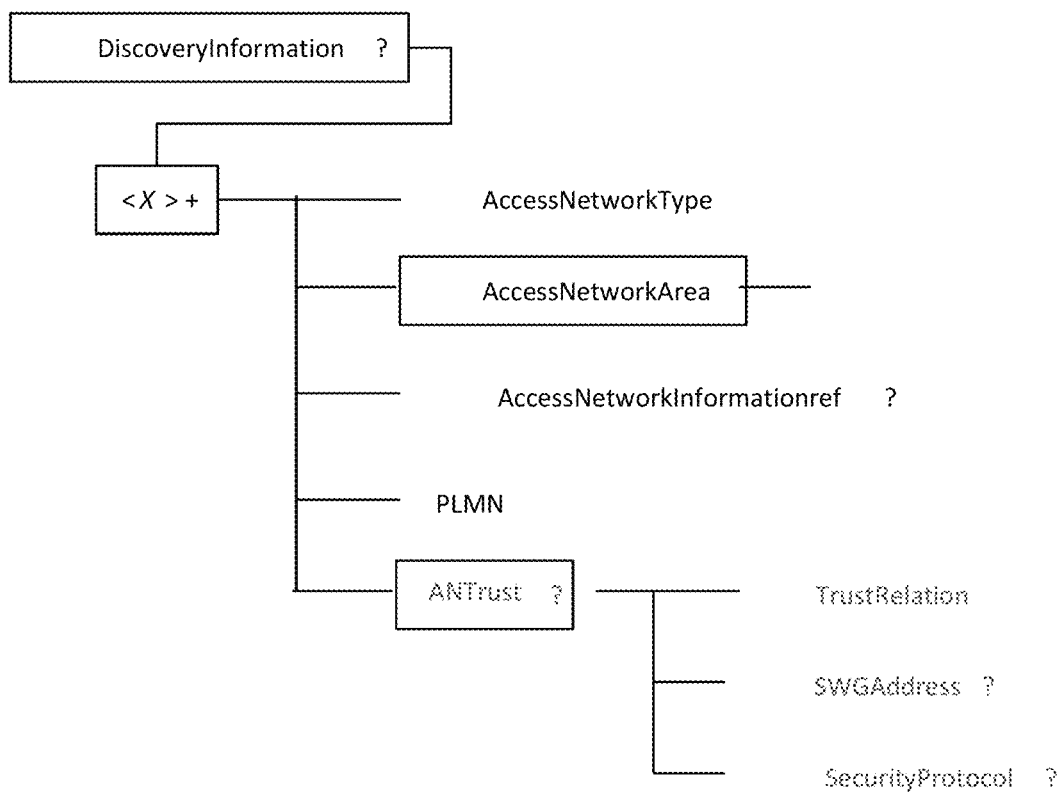
FIG. 12 illustrates an exemplary enhanced DiscoveryInformation ANDSF sub-tree.

FIG. 12 illustrates an exemplary enhanced DiscoveryInformation ANDSF sub-tree, e.g., ANDSF MO Enhancement. In the case of R8 implementations, a Policy Engine may install appropriate policies so that each IP Flow from an untrusted access is secured. In the case of R10 implementations, a Policy Engine may use this information limited to provisioning trust information for access networks. Policies for securing IP Flows may be driven by ISRP definition.

The AnTrust node may act as a placeholder for a description of the trust relationship with the access network and additional info in case the access network is un-trusted. One or more of the following may apply: Occurrence: zero or one; Format: node; Access Types Get, Replace; or values: N/A.

The TrustRelation leaf may indicate a trust relation with the access network. One or more of the following may apply: Occurrence: one; Format: bool; Access Types: Get, Replace; Values: <true/false>. True may apply if the access network is considered to be a trusted network. False may apply if the access network is considered to be an untrusted network.

The SGWAddress leaf may indicate the IP Address or FQDN of the operator's security gateway. This leaf may exists limited to the case where the TrustRelation leaf indicates an untrusted access network and provides the address of the gateway with which the UE may need to establish a secure tunnel. One or more of the following may apply: Occurrence: zero or one; Format: Chr; Access Types: Get, Replace; or Values: <an IPv4 address>, <an IPv6 address>.

The SecurityProtocol leaf may indicates the security protocols used for securing the IP Flow. Absence of this leaf may default to ESP. One or more of the following may apply: Occurrence: zero or one; Format: Chr; Access Types: Get, Replace; or Values: <ESP/ESP+AH>.

Figure 13:
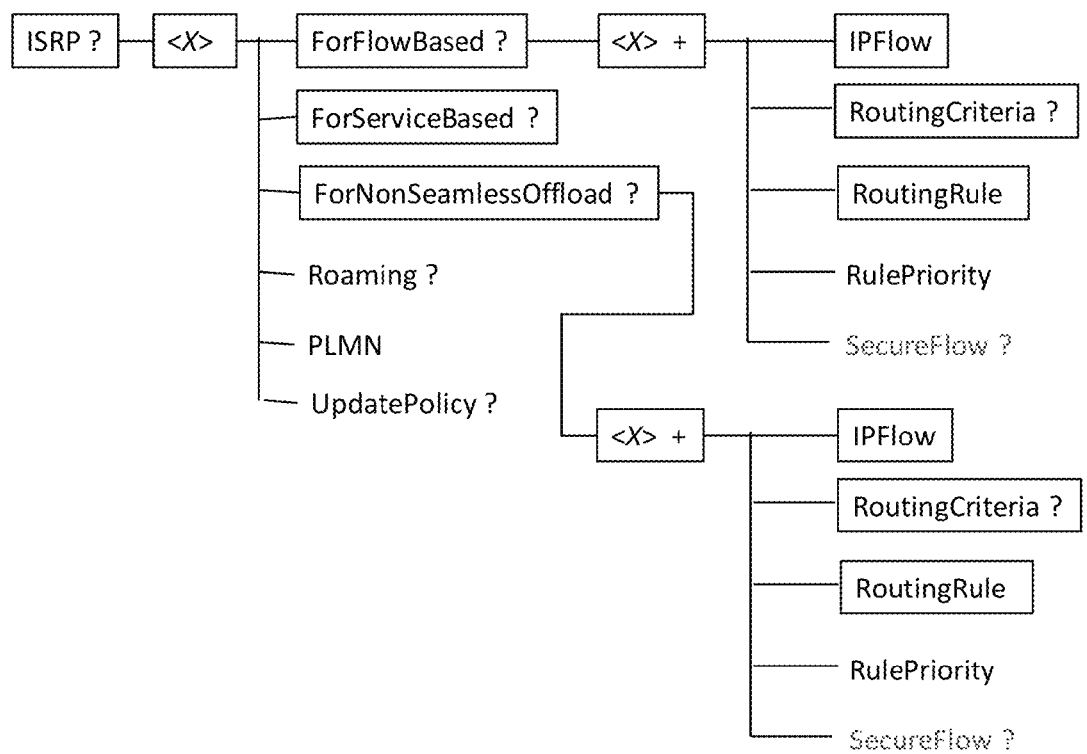
FIG. 13 illustrates an exemplary ISRP definition.

ANDSF enhancements may be disclosed, which may include the exemplary ISRP definition illustrated in FIG. 13. The ISRP definition may be enhanced to include whether a given IP Flow needs to be secured or not. One or more of the following may be taken into account (e.g., by a policy engine): the connectivity chosen for a given IP Flow (e.g., as per routing rule in ISRP) is a trusted access or untrusted access, where trust status of an access may be indicated in Discovery Info; or IP Flow is to be secured or not. Based on these, when an IP flow is routed via a non-trusted access, IP Sec tunnel may be setup. Additional ANDSF MO enhancements to specify IPsec parameters may be needed and may be added as a further sub-tree, e.g., in FIG. 13.

The SecureFlow leafs may indicate if the flow identified by the corresponding IPFlow node needs to be secured. Absence of this leaf may default to unsecured. One or more of the following may apply: Occurrence: zero or one; Format: bool; Access Types: Get, Replace; or Values: true/false.

Flow redirection may define a type of operation where an alternate destination IP address is defined for a flow—e.g., the destination IP address specified by the application through the socket call may not used and the data may be re-directed to an alternate IP address. This may be similar to redirection of web pages to a "splash page," e.g., used for sign-in web pages for public fee-based WiFi hot-spot. Here, this operation may be enabled at the IP layer and for an arbitrary IP flow. To enable this, an ANDSF policy may be defined and, subject to this policy, the UE may intercept each IP packet associated with the flow and replace the destination IP address in these packets with the IP address specified in the policy.

ANDSF enhancements to implement flow redirection may include one or more of the following: flow identified via IPFlow in the ISRP—5-Tuple, Domain Name Matching, etc.; a "Proxy To" rule added to ISRP, which may include a Destination IP which may be a range (e.g., the Destination IP or range may be mandatory), and a Port (e.g., optional); Flow may be sent to the "Proxy To" location over the application request; Routing Rule may apply for routing the flow; or Feature may be verified via a native web-browser and/or a set of web-sites.

Conditional execution rules may be applied to the policy, e.g., so that an application may be turned on or off (e.g., turn on by default, but turn off once the user completes some action). Conditional execution rules may involve communication duration, number of packets exchanged, feedback of a particular signaling to the policy manager (e.g. successful completion of sign-in), etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for a user equipment (UE) to communicate information to a network, the method comprising:

reporting, to an access network discovery and selection function (ANDSF) in the network, a traffic detection capability of the UE;

receiving, from the ANDSF, an ANDSF management object (ANDSF MO) that comprises a policy, wherein the ANDSF MO has a tree structure and includes information related to the traffic detection capability of the UE;

detecting, in accordance with the ANDSF MO, a traffic flow by monitoring for a call to activate a socket used by the traffic flow, wherein a 5-tuple associated with the traffic flow is unknown to the network;

instantiating, responsive to detecting the traffic flow, a new leaf corresponding to the traffic flow in a sub-tree of the ANDSF MO;

matching the socket to an application associated with the traffic flow;

determining the 5-tuple associated with the traffic flow;

populating the new leaf with the 5-tuple;

reporting the 5-tuple to the ANDSF, wherein the reporting is in response to at least one of receiving a request from the network requesting traffic flow information or determining that a condition specified in the policy has been met; and redirecting, in accordance with the policy received in the ANDSF MO, the traffic flow by intercepting an IP packet associated with the traffic flow and replacing a first IP address included in the IP packet when received at the UE with a second IP address that is different from the first IP address.

2. The method of claim 1, further comprising issuing an alert to the network, wherein the alert indicates to the network that the traffic flow has been detected, and wherein at least one of the following occurs: the alert is triggered for issue when an application name is associated with the traffic flow or the alert is triggered for issue when a traffic type is associated with the traffic flow.

3. The method of claim 1, further comprising issuing an alert to the network, wherein the alert indicates to the network that the traffic flow has been detected, and wherein the alert is triggered for issue when an element of the traffic flow relates to an alert generating element in the ANDSF MO.

4. The method of claim 1, further comprising associating the traffic flow with a timer.

5. The method of claim 4, further comprising removing a reference to the traffic flow when the timer expires.

6. The method of claim 5, wherein the reference is located in the ANDSF MO.

7. The method of claim 1, wherein the first IP address is a destination IP address specified by the application, and wherein the second IP address is an alternate IP address specified in the policy.

8. A user equipment (UE) configured to communicate information to a network, the UE comprising:

a processor configured to:
report, to an access network discovery and selection function (ANDSF) in the network, a traffic detection capability of the UE;

receive, from the ANDSF, an ANDSF management object (ANDSF MO) that comprises a policy, wherein the ANDSF MO has a tree structure and includes information related to the traffic detection capability of the UE;

detect, in accordance with the ANDSF MO, a traffic flow by monitoring for a call to activate a socket used by the traffic flow, wherein a 5-tuple associated with the traffic flow is unknown to the network;

instantiate, responsive to detecting the traffic flow, a new leaf corresponding to the traffic flow in a sub-tree of the ANDSF MO;

match the socket to an application associated with the traffic flow;

determine the 5-tuple associated with the traffic flow;

populate the new leaf with the 5-tuple;

report the 5-tuple to the ANDSF in response to at least one of receiving a request from the network requesting traffic flow information or determining that a condition specified in the policy has been met; and redirect, in accordance with the policy received in the ANDSF MO, the traffic flow by intercepting an IP packet associated with the traffic flow and replacing a first IP address included in the IP packet when received at the UE with a second IP address that is different from the first IP address.

9. The UE of claim 8, wherein the processor is further configured to issue an alert to the network, wherein the alert indicates to the network that the traffic flow has been detected, and wherein at least one of the following occurs: the alert is triggered for issue when an application name is associated with the traffic flow or the alert is triggered for issue when a traffic type is associated with the traffic flow.

10. The UE of claim 8, wherein the processor is further configured to issue an alert to the network, wherein the alert indicates to the network that the traffic flow has been detected, and wherein the alert is triggered for issue when an element of the traffic flow relates to an alert generating element in the ANDSF MO.

11. The UE of claim 8, wherein the processor is further configured to associate the traffic flow with a timer.

12. The UE of claim 11, wherein the processor is further configured to remove a reference to the traffic flow when the timer expires.

13. The UE of claim 12, wherein the reference is located in the ANDSF MO.

14. The UE of claim 8, wherein the first IP address is a destination IP address specified by the application, and wherein the second IP address is an alternate IP address specified in the policy.

15. The method of claim 1, wherein the traffic flow includes an identification of the application.

16. The UE of claim 8, wherein the traffic flow includes an identification of the application.

17. The method of claim 1, wherein the sub-tree is a flow-detection type sub-tree of the ANDSF MO.

18. The UE of claim 8, wherein the sub-tree is a flow-detection type sub-tree of the ANDSF MO.

* * * * *